(12) United States Patent
Okuda et al.

(10) Patent No.: US 7,777,468 B2
(45) Date of Patent: Aug. 17, 2010

(54) SEMICONDUCTOR APPARATUS

(75) Inventors: Tsugunori Okuda, Kanagawa (JP); Shinya Shimizu, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 254 days.

(21) Appl. No.: 12/007,235

(22) Filed: Jan. 8, 2008

(65) Prior Publication Data
US 2008/0169793 A1    Jul. 17, 2008

(30) Foreign Application Priority Data
Jan. 11, 2007    (JP) .............................. 2007-002975

(51) Int. Cl.
G05F 1/40    (2006.01)
(52) U.S. Cl. ...................................... 323/282
(58) Field of Classification Search ................. 323/222, 323/223, 225, 268, 271, 272, 282, 285, 349–351
See application file for complete search history.

(56) References Cited

U.S. PATENT DOCUMENTS 7,166,992 B2 *    1/2007 Kudo et al. .................. 323/282
7,589,509 B2 *    9/2009 Nishida ....................... 323/283
2009/0085540 A1 *    4/2009 Nishida ....................... 323/282

FOREIGN PATENT DOCUMENTS

JP    3402983    2/2003
JP    2007-252137    9/2007

* cited by examiner

*Primary Examiner*—Matthew V Nguyen
(74) *Attorney, Agent, or Firm*—Dickstein Shapiro LLP

(57) ABSTRACT

A semiconductor apparatus that constitutes a step-down type switching regulator is disclosed.

The semiconductor apparatus includes a switching transistor, an inductor, a transistor for rectification, and a transistor for synchronous rectification. The transistor for rectification is connected between a connecting point where the switching transistor and the inductor L1 are connected and ground potential; and a gate of this transistor is connected to the connecting point.

The transistor for synchronous rectification is connected parallel to the transistor for rectification. A control signal is provided to a gate of the transistor for synchronous rectification so that a switching operation that is opposite to an operation of the switching transistor may be performed. The transistor for synchronous rectification is arranged closer to the connecting point than the transistor for rectification.

11 Claims, 8 Drawing Sheets

PRIOR ART

PRIOR ART

SEMICONDUCTOR APPARATUS

BACKGROUND OF THE INVENTION

1. Field of the Invention

The present invention generally relates to a semiconductor apparatus configured to function as a step-down type switching regulator, and especially relates to a semiconductor apparatus configured to function as a step-down type switching regulator wherein asynchronous rectification is carried out if a load current is small, and synchronous rectification is carried out when the load current is great.

2. Description of the Related Art

Rectification methods employed by step-down type switching regulators that use an inductor include a synchronous rectification method and an asynchronous rectification method. The step-down type switching regulators work in two modes, namely, a continuous operation mode and an intermittent mode. The continuous mode is where a great load current flows and a current continues flowing through the inductor. The intermittent mode is where the load current is small and the current may not always flow through the inductor.

FIG. 7 is a circuit diagram of an example of an output circuit of a conventional step-down type switching regulator using the synchronous rectification method.

According to the conventional step-down type switching regulator with the output circuit as shown in FIG. 7, efficiency is high in the continuous operation mode; however, efficiency is remarkably degraded in the intermittent mode, because a reverse current flows from a load (Vout) to ground potential through a transistor M102 for synchronous rectification.

When the load is light, switching between a switching transistor M101 and the transistor M102 for synchronous rectification is frequently carried out, which generates a switching loss. In order to mitigate the switching loss, switching to PFM control from PWM control is often performed.

Further, while the PFM control takes place, the output circuit is arranged to provide asynchronous rectification in order to prevent efficiency degradation by the reverse current. As shown in FIG. 8, a common practice is to use a diode D101 as a component for rectification in the output circuit of the step-down type switching regulator using the asynchronous rectification method. According to the circuit shown in FIG. 8, the reverse current can be prevented because a potential on the side of the load serves as a backward bias for the diode D101 even if the intermittent mode takes place. However, since the diode D101 has a relatively great forward voltage such as 0.6 V, power consumption by the diode D101 is great, and the efficiency cannot be remarkably improved.

In this connection, Patent Reference 1, for example, discloses a circuit of a switching regulator as shown in FIG. 9, whereby efficiency of the asynchronous rectification method is improved.

As shown in FIG. 9, the circuit includes a bipolar transistor Q101 for switching, which transistor is a PNP transistor. A driving signal is provided to the base of the bipolar transistor Q101, wherein the driving signal is provided by a PWM comparator that is not illustrated. If the driving signal is H (high level) and the bipolar transistor Q101 is turned off, a voltage V101 at an end of an inductor L101 falls to a negative voltage. The circuit further includes a comparator CMP101. A non-inverting input terminal of the comparator CMP101 is connected to ground potential. An inverting input terminal of the comparator CMP101 is provided with the voltage V101 at a connecting point of the bipolar transistor Q101 and an inductor L101. The comparator CMP101 has hysteresis.

If the voltage V101 is a negative voltage, an output of the comparator CMP101 becomes H (high level). The output of the comparator CMP101 is provided to the gate of a MOS transistor M102 for rectification and the MOS transistor M102 is turned on. Accordingly, no current flows into the inductor L101. If the voltage V101 becomes greater than ground potential, the output of the comparator CMP101 is L (low level), and turns off the MOS transistor M102 such that a reverse current from the load (Vout) is prevented. By using a device having an ON resistance that is smaller than a Schottky diode D101 as the MOS transistor M102 for rectification, the efficiency of the asynchronous rectification is raised.

[Patent Reference 1] JP 3402983

DISCLOSURE OF THE INVENTION

Objective of the Invention

However, according to the circuit shown in FIG. 9, since the MOS transistor M102 for rectification is controlled by the comparator CMP101, there is a delay in operations before the MOS transistor M102 for rectification is turned on when the voltage V101 falls to negative voltage. In order to compensate for the operational delay, the Schottky diode D101 is provided. For this reason, the MOS transistor M102 for rectification and the comparator CMP101 are added to the circuit shown in FIG. 8, posing a problem that a circuit area (space required for the circuit) is increased.

SUMMARY OF THE INVENTION

The present invention provides a semiconductor apparatus that substantially obviates one or more of the problems caused by the limitations and disadvantages of the related art.

Specifically, the present invention provides a semiconductor apparatus configured to efficiently function as a step-down type switching regulator without increasing the circuit area (space required for the circuit).

Features of embodiments of the present invention are set forth in the description that follows, and in part will become apparent from the description and the accompanying drawings, or may be learned by practice of the invention according to the teachings provided in the description. Problem solutions provided by an embodiment of the present invention may be realized and attained by a semiconductor apparatus particularly pointed out in the specification in such full, clear, concise, and exact terms as to enable a person having ordinary skill in the art to practice the invention.

Means for Solving a Problem

To achieve these solutions and in accordance with an aspect of the invention, as embodied and broadly described herein, an embodiment of the invention provides a semiconductor apparatus as follows.

The semiconductor apparatus is for receiving an input voltage at an input terminal, for stepping down the input voltage to a predetermined constant output voltage, and for providing the output voltage from an output terminal, wherein a step-down type switching regulator including a serial circuit of a switching transistor and an inductor is provided between the input terminal and the output terminal.

According to an aspect of the embodiment, the semiconductor apparatus comprises:

a P type transistor for rectification connected between a negative side of a power supply voltage and a connection point of the switching transistor and the inductor, wherein a control electrode of the P type transistor is connected to the connection point of the switching transistor and the inductor, and a transistor for synchronous rectification, wherein a control signal is provided to a control electrode of the transistor for synchronous rectification for performing a switching operation that is opposite to the switching transistor, wherein the transistor for synchronous rectification is connected parallel to the P type transistor for rectification, wherein the transistor for synchronous rectification is arranged closer to the connection point of the switching transistor and the inductor than the P type transistor for rectification.

According to another aspect of the embodiment, the semiconductor apparatus further includes a drive controlling circuit for controlling a drive of the transistor for synchronous rectification, wherein the drive controlling circuit causes the transistor for synchronous rectification to perform switching if the control signal provided is for triggering the synchronous rectification mode, and causes the transistor for synchronous rectification to be turned off if the control signal provided is for triggering the asynchronous rectification mode.

Here, when the load is light and consumption current is low, the control signal for triggering the asynchronous rectification mode is provided to the drive controlling circuit; and when the load is normal, the control signal for triggering the synchronous rectification mode is provided to the drive controlling circuit.

According to another aspect of the embodiment, the transistor for rectification is one of a PMOS transistor and a PNP transistor.

EFFECTIVENESS OF INVENTION

According to the semiconductor apparatus of the embodiment of the present invention, the transistor for synchronous rectification is arranged closer to the connection point of the switching transistor and the inductor than the transistor for rectification. In this way, the efficiency is improved whether or not the load is light, but without increasing the area (space) required for the circuit.

DESCRIPTION OF THE PREFERRED EMBODIMENTS

Figure 1:
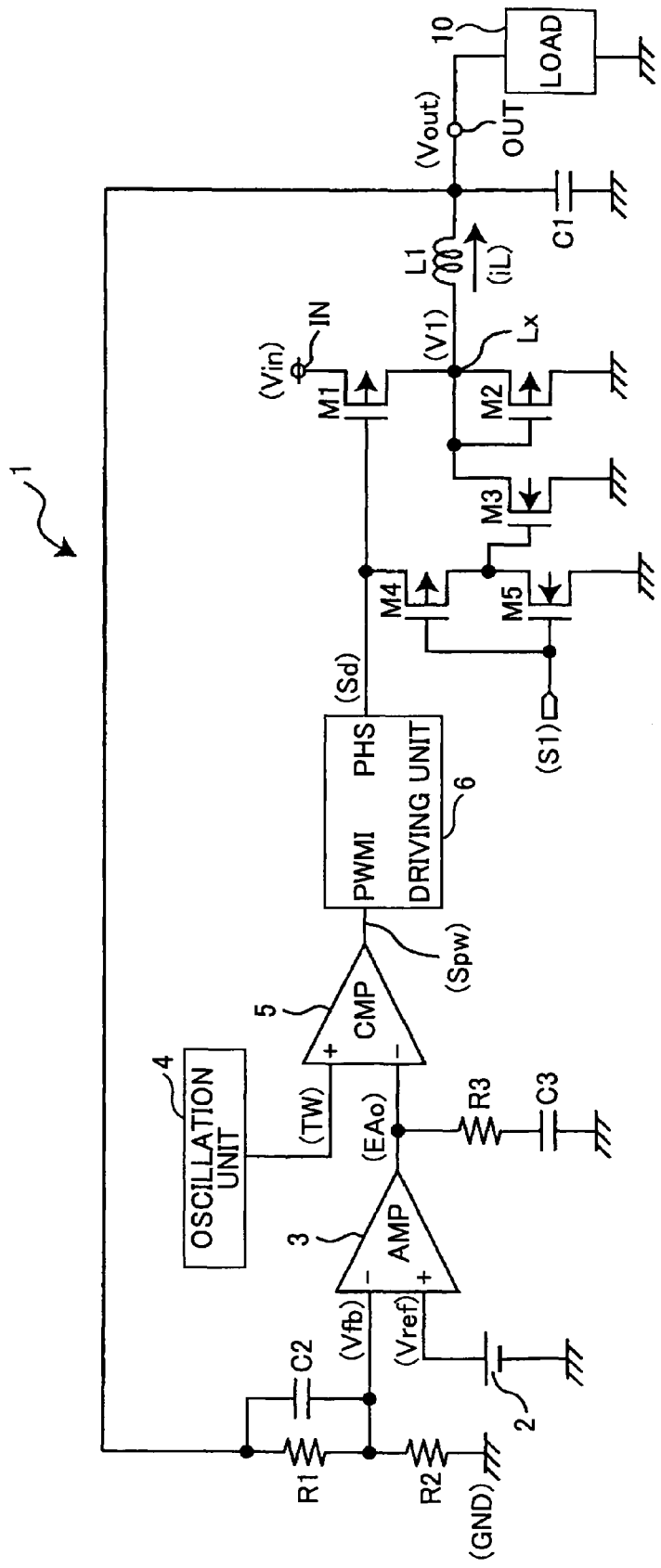
FIG. 1 is a circuit diagram of an example of a circuit of a step-down type switching regulator that is the semiconductor apparatus according to an embodiment of the present invention.

In the following, embodiments of the present invention are described with reference to the accompanying drawings.

An example of a circuit of a step-down type switching regulator 1 of a semiconductor apparatus according to the embodiment of the present invention is described with reference to FIG. 1.

The step-down type switching regulator 1 (hereafter called the switching regulator 1) includes a switching transistor M1, which is a PMOS transistor, for performing switching operations in order to perform output control of an input voltage Vin, and a transistor M2, which is a PMOS transistor, for rectification.

The switching regulator 1 converts the input voltage Vin provided to an input terminal IN into a predetermined constant voltage, namely, an output voltage Vout, and provides the output voltage Vout to a load 10 from an output terminal OUT.

Further, the switching regulator 1 includes a transistor. M3, which is a NMOS transistor, for synchronous rectification, a PMOS transistor M4, and a NMOS transistor M5. The PMOS transistor M4 is for controlling whether a driving signal Sd provided to the gate of the switching transistor M1 is to be provided to the gate of the transistor M3 based on a switching signal S1. Further, the switching regulator 1 includes a reference-voltage generating unit 2, resistors R1 and R2 for output-voltage detection, an inductor L1, a capacitor C1 for smoothing, a capacitor C2 serving as a noise filter, a resistor R3 and a capacitor C3 for phase-angle compensation, an differential amplifier 3, an oscillation unit 4, a PWM comparator 5 (shown as "CMP" in FIG. 1), and a driving unit 6.

Here, all the components described above except for the inductor L1 and the capacitor C1 may be integrated into one IC; alternatively, all the components described above including at least one of the switching transistor M1, the transistor M2, and the transistor M3, except for the inductor L1 and the capacitor C1, may be integrated into one IC. In addition, the PMOS transistor M4 and the NMOS transistor M5 serve as the drive controlling circuit, and the switching signal S1 serves as the control signal.

The reference-voltage generating unit 2 generates and outputs a predetermined reference voltage Vref. The resistors R1 and R2 for output-voltage detection divide the output voltage Vout to produce a divided voltage Vfb, and output the divided voltage Vfb. The differential amplifier 3 amplifies a voltage difference between the divided voltage Vfb and the reference voltage Vref, and outputs an output signal EAo.

Further, the oscillation unit 4 generates and outputs a predetermined triangular wave signal TW, and the PWM comparator 5 generates and outputs a pulse signal Spw for performing PWM control based on the output signal EAo of the differential amplifier 3 and the triangular wave signal TW. The driving unit 6 generates the driving signal Sd for driving the switching transistor M1 based on the pulse signal Spw, and outputs the driving signal Sd to the gate of the switching transistor M1.

As shown in FIG. 1, the switching transistor M1 and the transistor M2 for rectification are connected in series at a connecting point Lx between the input terminal IN and ground potential GND. The gate of the transistor M2 is connected to the connecting point Lx. The inductor L1 is connected between the connecting point Lx and the output terminal OUT. Further, the transistor M3 is connected between the connecting point Lx and ground potential GND. The PMOS transistor M4 and the NMOS transistor M5 are connected in series between the gate of the switching transistor M1 and ground potential GND. The gate of the transistor M3 is connected to a connection point of the PMOS transistor M4 and the NMOS transistor M5. A switching signal S1 is provided from an external source to the gates of the PMOS transistor M4 and the NMOS transistor M5.

Between the output terminal OUT and ground potential GND, while the resistors R1 and R2 are connected in series, the capacitor C1 is connected. The divided voltage Vfb is obtained at a connection point of the resistors R1 and R2. Further, the capacitor C2 is connected parallel to the resistor R1. As for the differential amplifier 3, the divided voltage Vfb is provided to the inverting input terminal, the reference voltage Vref is provided to the non-inverting input terminal, and the output terminal is connected to the inverting input terminal of the PWM comparator 5. Further, between the output terminal of the differential amplifier 3 and ground potential GND, the resistor R3 and the capacitor C3 are connected in series, which arrangement serves as a phase-angle compensating unit. The triangular wave signal TW is provided to the non-inverting input terminal of the PWM comparator 5. The pulse signal Spw that is output from the PWM comparator 5 is provided to the input terminal PWMI of the driving unit 6. The driving signal Sd is provided to the gate of the switching transistor M1 from an output terminal PHS of the driving unit 6. The driving signal Sd is a clock signal that is alternated between the high level (H) and the low level (L).

With the configuration described above, the differential amplifier 3 amplifies the difference between the reference voltage Vref and the divided voltage Vfb, and outputs the amplified difference to the inverting input terminal of the PWM comparator 5. Since the oscillation unit 4 provides the triangular wave signal TW to the non-inverting input terminal of the PWM comparator 5, the PWM comparator 5 outputs the signal Spw having a pulse width corresponding to the output signal EAo of the differential amplifier 3 to the input terminal PWMI of the driving unit 6. The driving unit 6 outputs the driving signal Sd from the output terminal PHS corresponding to the pulse width of the pulse signal Spw that is provided to the input terminal PWMI, and carries out ON/OFF control of the switching transistor M1. That is, if the output voltage Vout declines, the voltage of the output signal EAo of the differential amplifier 3 rises; then, the output pulse width of the PWM comparator 5 is increased; then, the duration of the switching transistor M1 being turned on is increased; and then, the output voltage Vout is raised. On the contrary, when the output voltage Vout rises, operations opposite to the above are performed so that the output voltage Vout is reduced. In this way, the output voltage Vout is always maintained at a fixed voltage.

Here, the case wherein the switching signal S1 is fixed at the high level (H) is described. If the switching signal S1 is H, the NMOS transistor M5 is turned on, and the PMOS transistor M4 is turned off. Accordingly, the gate of the transistor M3 for synchronous rectification takes ground potential GND, and the transistor M3 for synchronous rectification is turned off.

Figure 2:
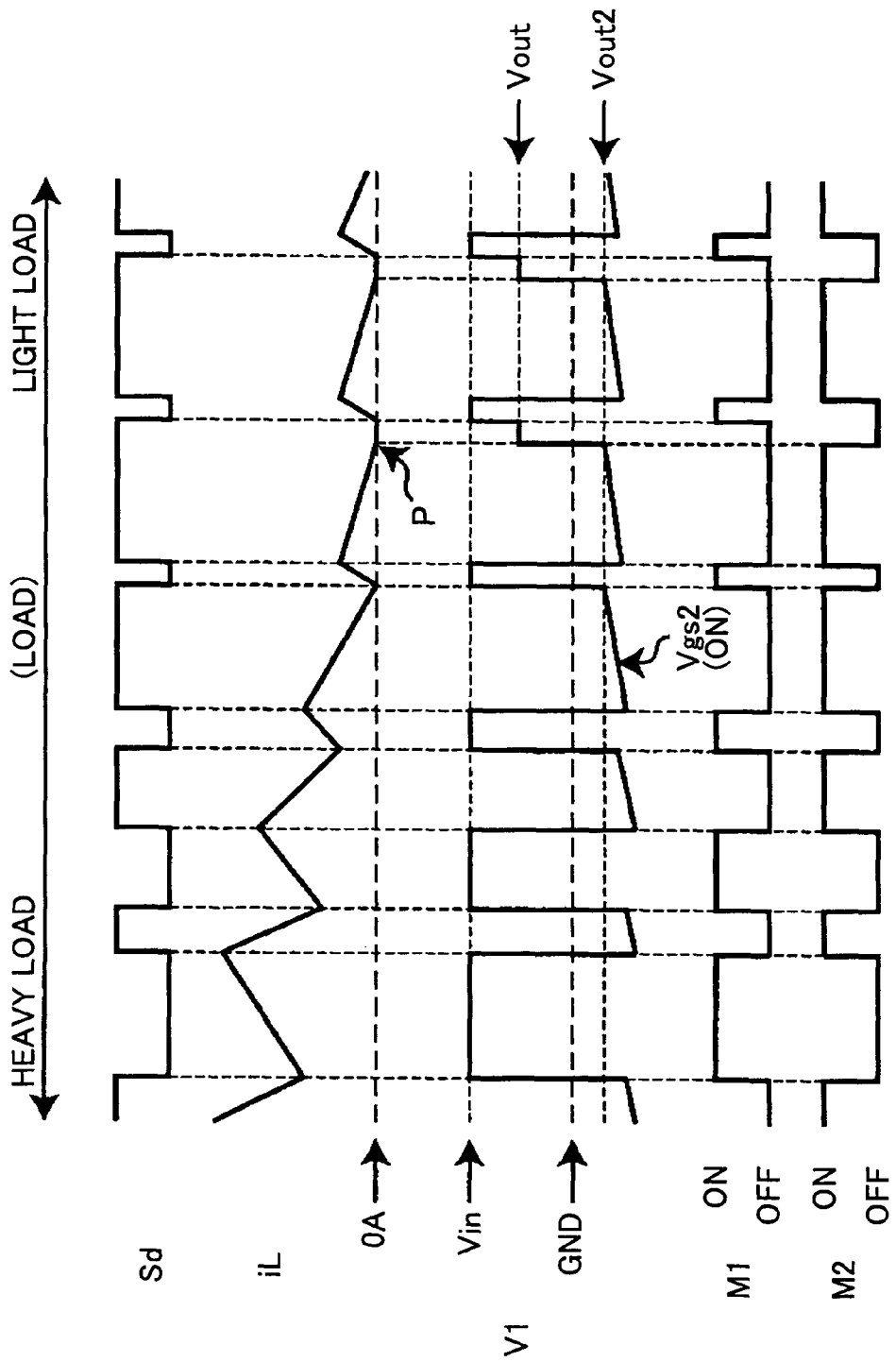
FIG. 2 is a timing chart showing examples of waveforms of signals at corresponding points indicated in FIG. 1.

FIG. 2 is a timing chart showing examples of waveforms of the signals indicated in FIG. 1 in the above-described case. With reference to FIG. 2, operations of the circuit of FIG. 1 when the switching signal S1 is H are described.

That is, the inductor current iL flowing through the inductor L1 does not fall to 0 A while the switching transistor M1 is turned off if the load current flowing into the load 10 is great. However, if the load current is decreased, duration of the switching transistor M1 being turned off becomes greater, and the inductor current iL is decreased. When the load current is further decreased, and the inductor current iL is decreased to 0 A as indicated by a point P in FIG. 2, the voltage V1 at the connecting point Lx is raised to the output voltage Vout, and the transistor M2 for rectification is turned off. Consequently, the inductor current iL becomes zero, i.e., a reverse current is prevented from flowing.

Figure 3:
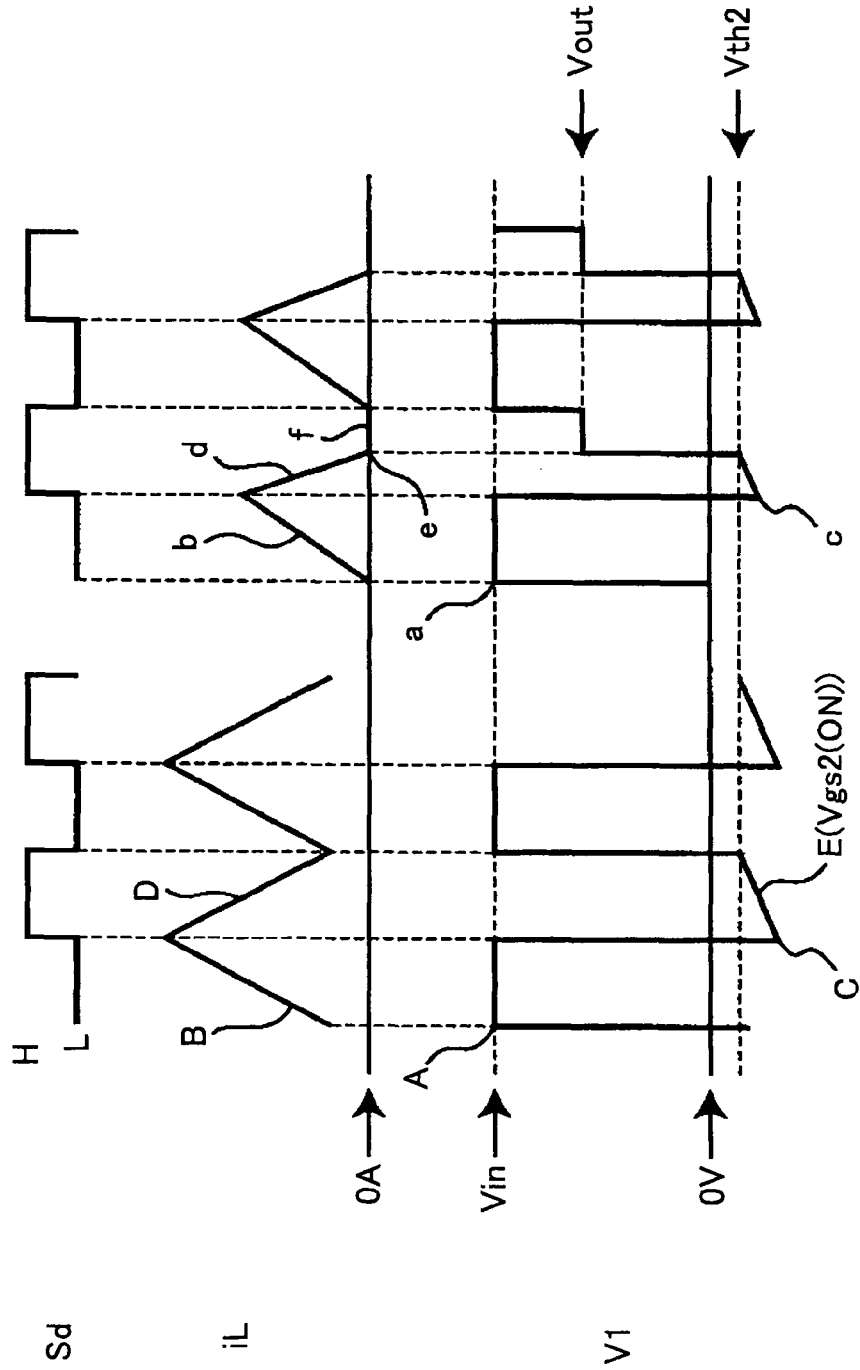
FIG. 3 is a timing chart showing relationships between a driving signal Sd, an inductor current iL, and a voltage V1.

FIG. 3 shows an example of relationships between the driving signal Sd, the inductor current iL, and the voltage V1 at the connecting point Lx. A continuous operation mode wherein the load is heavy is shown on the left-hand side of FIG. 3 (indicated by (a)). An intermittent operation mode wherein the load is light is shown on the right-hand side of FIG. 3 (indicated by (b)).

First, the continuous operation mode is described.

If the driving signal Sd is changed from H to L, the switching transistor M1 is turned on, and the voltage V1 becomes almost equal to the input voltage Vin as indicated by "A" in FIG. 3. While the driving signal Sd stays L, the inductor current iL increases as shown by "B" in FIG. 3.

If the driving signal Sd is changed to H, although the switching transistor M1 is turned off, the current iL tends to continue to flow through the inductor L1, a counter-electromotive force arises, and the voltage V1 falls to a negative voltage. If the voltage V1 reaches a threshold voltage Vth2 of the transistor M2, the transistor M2 is turned on and the inductor current iL starts flowing toward the load 10 from ground potential GND through the transistor M2. In addition, since the voltage V1 at this time is equal to a gate voltage Vgs2 corresponding to the drain current that flows through the transistor M2, the greater the load current, the smaller the voltage V1. While the driving signal Sd stays H, since the inductor current iL gradually decreases as indicated by "D" in FIG. 3, the voltage V1 that is the gate voltage Vgs2 when the rectification transistor M2 is turned on gradually rises as indicated by "E" in FIG. 3. Although the inductor current iL decreases, the inductor current iL does not reach 0 A because the driving signal Sd is changed to L before iL reaches 0 A.

Next, operations of the intermittent mode when the load is light are described. Here, the intermittent mode operations after the driving signal Sd is changed to L, while Sd stays in L, and until Sd is changed to H, are the same as the continuous operation mode, and accordingly descriptions are not repeated.

When the driving signal Sd is changed to H, and while Sd stays in H, the inductor current iL is gradually decreased as shown at "d" on the right-hand side (indicated by (b)) of FIG. 3, and for this reason, the voltage V1 is gradually increased. When the inductor current iL reaches 0 A as indicated by "e" in FIG. 3, the voltage V1 is raised to the output voltage Vout. Consequently, the transistor M2 for rectification is turned off, and the inductor current iL does not flow, that is, a reverse current is prevented from flowing as shown at "f" of FIG. 3.

As described, since the reverse current is prevented even when the operations take place in the intermittent mode for the light load, the semiconductor apparatus according to an embodiment is capable of providing high efficiency.

Figure 4:
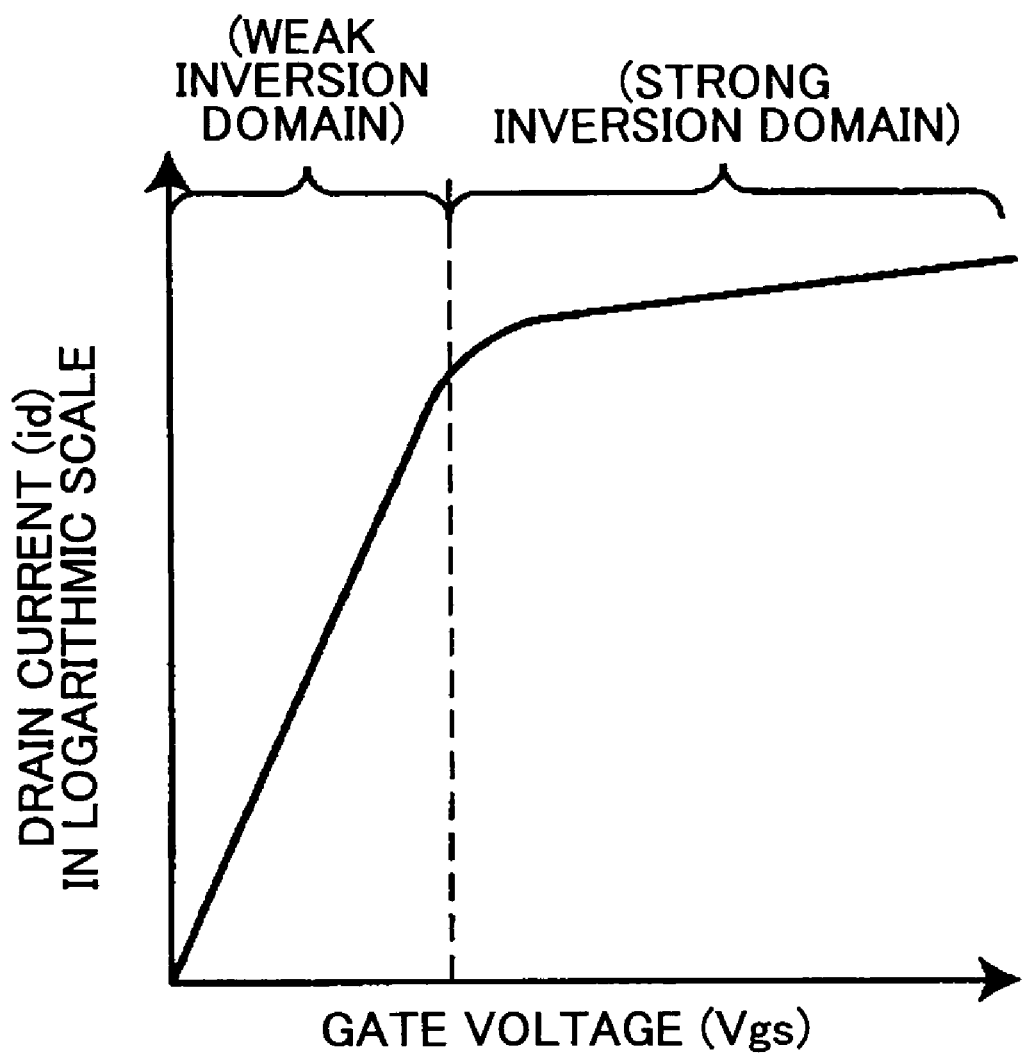
FIG. 4 is a graph showing relationships between a gate voltage Vgs and a drain current id of a MOS transistor.

Next, relationships between the gate voltage Vgs and the drain current id of a MOS transistor are described with reference to FIG. 4, wherein the vertical axis is in a logarithmic scale. In FIG. 4, in a weak inversion domain of the MOS transistor, the gate voltage Vgs is proportional to the logarithm of the drain current id, and the drain current id is proportional to the square of the gate voltage Vgs in a strong inversion domain. That is, the smaller is the drain current id, the smaller is the gate voltage Vgs; that is, the smaller (lighter) the load, the greater the efficiency improvement.

Further, by specifying a threshold voltage Vth of the MOS transistor to be smaller than the forward voltage of the conventional diode for rectification (note that the threshold voltage Vth of the MOS transistor can be adjusted by a manufacturing process), the efficiency when the load is great (heavy) can be raised.

Here, if the load is light, the switching signal S1 is made H, and if the load is heavy, the switching signal S1 is made L.

Accordingly, if the load is light, the PMOS transistor M4 is turned off and the NMOS transistor M5 is turned on. Then, the gate voltage of the transistor M3 becomes ground potential GND, and the transistor M3 is turned off. In this way, asynchronous rectification is carried out by the transistor M2.

On the other hand, if the load is heavy, the PMOS transistor M4 is turned on, the NMOS transistor M5 is turned off, and the driving signal Sd is input to the gate of the transistor M3. For this reason, the transistor M3 performs ON/OFF operations in a complementary manner with the switching transistor M1, and synchronous rectification is performed. When the transistor M3 is turned on, the voltage V1 is reduced to near 0 V, which voltage is below the threshold voltage of the transistor M2; accordingly, the transistor M2 is kept being turned off and does not contribute to the rectification. However, if the voltage V1 when the transistor M3 is turned on exceeds the threshold voltage of the transistor M2, the transistor M2 is turned on and contributes to the rectification.

Figure 8:
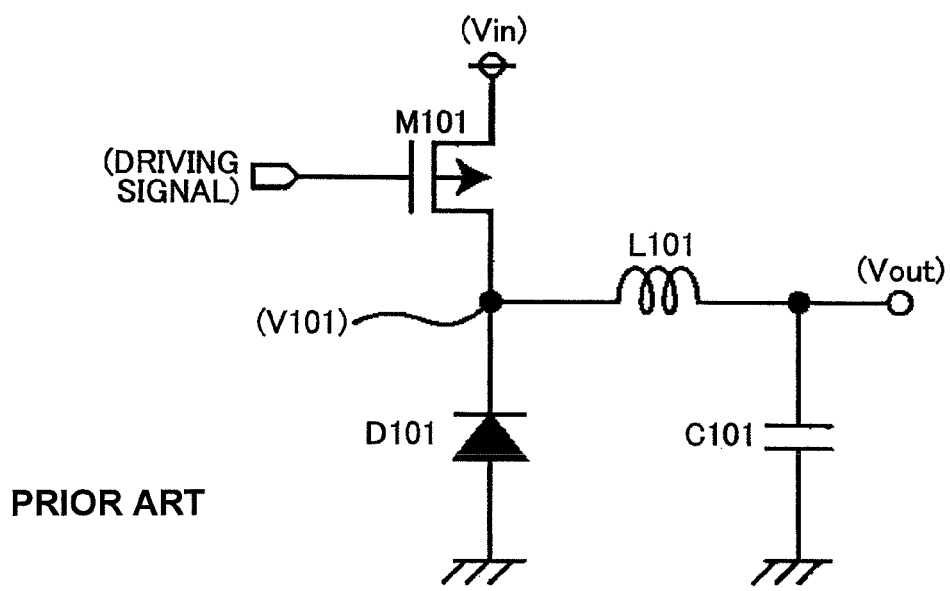
FIG. 8 is a circuit diagram of another example of the output circuit of the conventional step-down type switching regulator.
Figure 9:
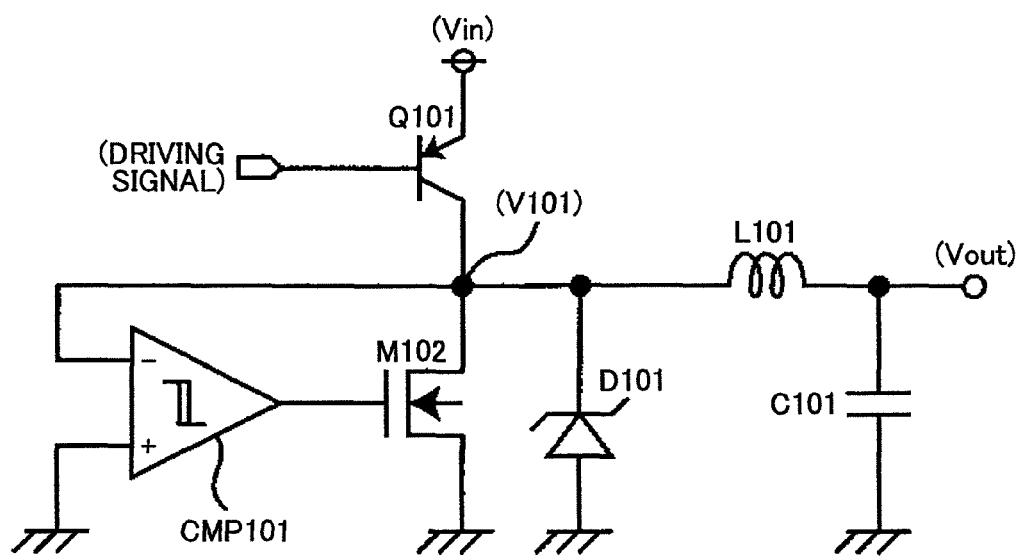
FIG. 9 is a circuit diagram of another example of the output circuit of the conventional step-down type switching regulator.

In this way, when the load is light wherein the inductor current iL is small, the voltage Vgs between the gate and the source of the transistor M2 is small. According to an embodiment, a PMOS transistor that is diode-connected is used instead of the diode D101 in the case of the conventional circuit shown in FIG. 8. In this way, efficiency is improved compared with the case wherein a diode for rectification is used without increasing the number of components; note that the number of components is increased in the case of the conventional circuit shown in FIG. 9. Further, when the load is heavy and the inductor current iL is great, since synchronous rectification is performed by the transistor M3, the efficiency is improved compared with asynchronous rectification by for example, a diode.

Figure 5:
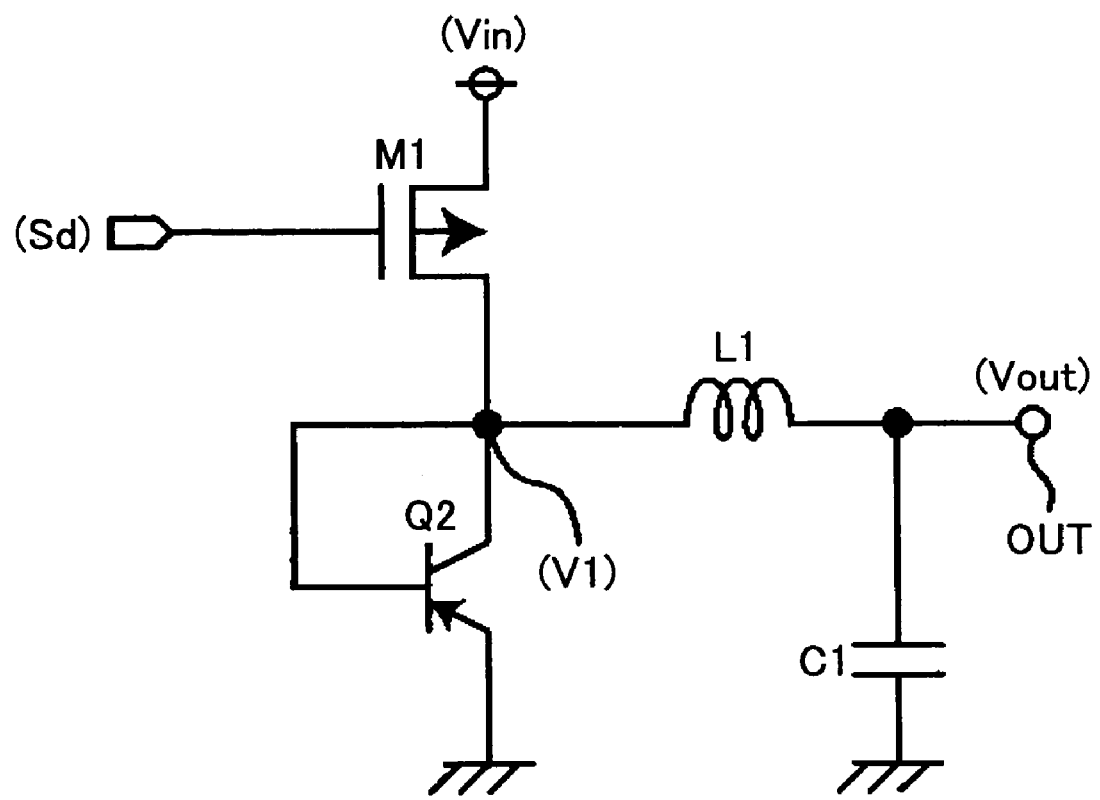
FIG. 5 is a circuit diagram of another example of the step-down type switching regulator according to an embodiment of the present invention.

In addition, the transistor M2 for rectification in FIG. 1 may be replaced with a PNP transistor Q2 for rectification as shown in FIG. 5.

Operations of the circuit shown in FIG. 5 are completely the same as the circuit with the PMOS transistor M2 shown in FIG. 1. Further, since the voltage V1 when the transistor Q2 for rectification is turned on becomes a voltage Vbe between the emitter and base of the transistor Q2 for rectification, efficiency is equivalent to the conventional technique shown in FIG. 8 where the diode D101 is used.

When the circuit of the switching regulator 1 as shown in FIG. 1 is implemented, circuit layout is important; especially when the load is heavy, the efficiency may be degraded depending on the circuit layout.

Figure 6:
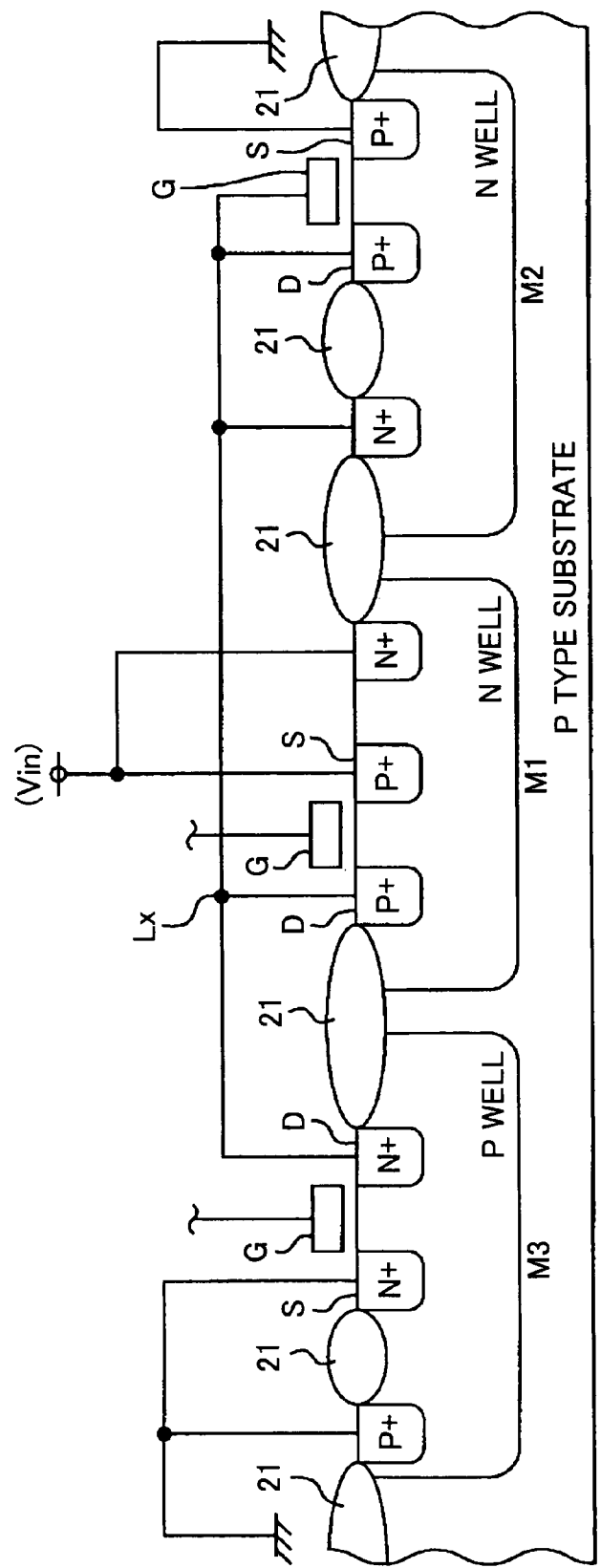
FIG. 6 is a simplified cross-sectional diagram showing an outline structure of the semiconductor apparatus according to an embodiment of the present invention.
Figure 7:
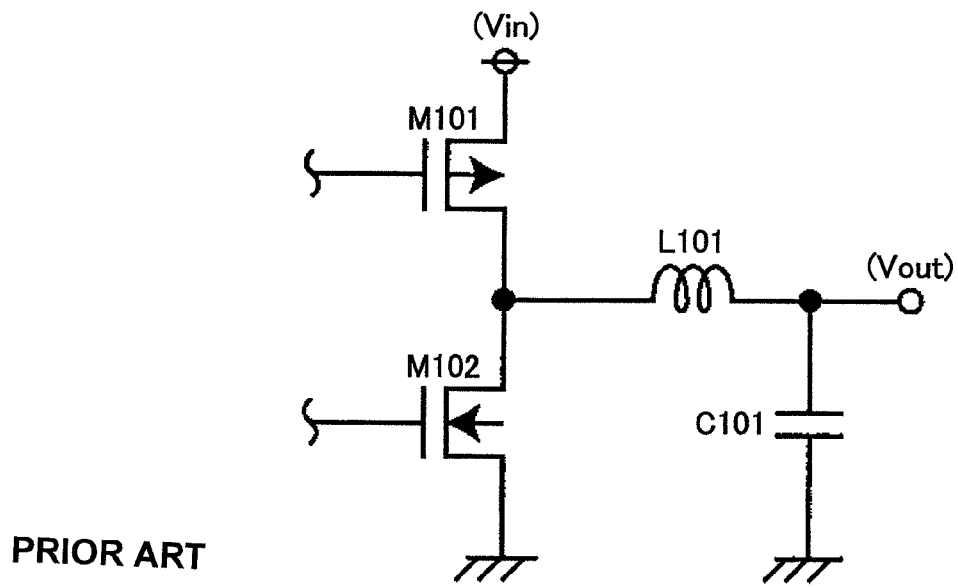
FIG. 7 is a circuit diagram of an example of an output circuit of a conventional step-down type switching regulator.

FIG. 6 is a cross-sectional drawing showing an example of the semiconductor apparatus according to the embodiment of the present invention. Here, only the switching transistor M1, the transistor M2, and the transistor M3 of FIG. 1 are shown in FIG. 6. Nevertheless, the PMOS transistors M4 and M5 may be included. Further, other components may be added to constitute the IC as described above.

The semiconductor apparatus according to the embodiment shown in FIG. 6 includes field oxidization films 21, drains D, sources S, and gates G of the MOS transistors M1, M2, and M3. Here, as shown in FIG. 6, the transistor M3 that becomes active when the load is heavy is arranged near the connecting point Lx of the switching transistor M1 and the inductor L1, rather than the transistor M2 that becomes active when the load is light. By arranging the transistors M1, M2, and M3 in this way, the switching regulator 1 not only improves the efficiency when the load is light, but also prevents efficiency degradation when the load is heavy.

As described, within the semiconductor apparatus according to an embodiment of the present invention, the transistor M3 for synchronous rectification is arranged closer to the connecting point Lx of the switching transistor M1 and the inductor L1 than the transistor M2. In this way, efficiency is improved whether the load is heavy or light but without greatly increasing the area (space) required of the circuit.

Further, the present invention is not limited to these embodiments, but variations and modifications may be made without departing from the scope of the present invention.

The present application is based on Japanese Priority Application No. 2007-002975 filed on Jan. 11, 2007 with the Japanese Patent Office, the entire contents of which are hereby incorporated by reference.

What is claimed is:

1. A semiconductor apparatus that serves as a step-down type switching regulator wherein an inductor and a switching transistor are serially connected between an input terminal and an output terminal for stepping down an input voltage provided to the input terminal to a predetermined constant voltage and for providing the constant voltage to an external load from the output terminal, the semiconductor apparatus comprising:

a connection point where the switching transistor and the inductor are connected;

a P type transistor for rectification that is connected between the connection point and a negative side of a power supply voltage, wherein a control electrode of the P type transistor is connected to the connection point; and a transistor for synchronous rectification connected in parallel with the P type transistor for rectification, wherein a control signal is provided to a control electrode of the transistor for synchronous rectification such that a switching operation that is opposite to an operation of the switching transistor may be performed; wherein the transistor for synchronous rectification is arranged closer to the connection point than the P type transistor for rectification.

2. The semiconductor apparatus as claimed in claim 1, further comprising:

a drive controlling circuit for controlling an operation of the transistor for synchronous rectification according to a control signal provided from an external source, wherein the drive controlling circuit causes the transistor for synchronous rectification to:

perform switching if the control signal indicates that the operation is to be in a synchronous rectification mode, and be turned off if the control signal indicates that the operation is to be in an asynchronous rectification mode.

3. The semiconductor apparatus as claimed in claim 2, wherein if a current consumed by the load is reduced for a low power operation, the control signal indicates to the drive control circuit that the operation is to be in an asynchronous rectification mode and if the current consumed by the load is normal for a normal power operation, the control signal indicates to the drive control circuit that the operation is to be in a synchronous rectification mode.

4. The semiconductor apparatus as claimed in claim 1, wherein the P type transistor for rectification is a PMOS transistor.

5. The semiconductor apparatus as claimed in claim 1, wherein the P type transistor for rectification is a PNP transistor.

6. A method of operating a device for providing a constant voltage to an external load from the output terminal, comprising:
- a switching transistor performing a switching operation;
- connecting a synchronous rectification transistor in parallel with a P type transistor;
- providing a control signal to a control electrode of the synchronous rectification transistor from an external source, thereby
- performing a switching operation that is opposite to the switching operation of a switching transistor; and
- a drive controlling circuit controlling an operation of the transistor for synchronous rectification according to the control signal, wherein the drive controlling circuit causes the synchronous rectification transistor to:
  - perform switching if the control signal indicates that the operation is to be in a synchronous rectification mode, and
  - turn off if the control signal indicates that the operation is to be in an asynchronous rectification mode.

7. The method of claim 6, wherein
if a current consumed by the load is reduced for a low power operation, the control signal indicates to the drive control circuit that the operation is to be in an asynchronous rectification mode, and
if the current consumed by the load is normal for a normal power operation, the control signal indicates to the drive control circuit that the operation is to be in a synchronous rectification mode.

8. The method of claim 7, wherein
if the device is operating in an asynchronous rectification mode, operating the P-type transistor and shutting off the synchronous rectification transistor; and
if the device is operating in a synchronous rectification mode, operating the synchronous rectification transistor.

9. The method of claim 8, wherein
if the device is operating in synchronous rectification mode, operating the synchronous rectification transistor and also the P-type transistor.

10. A method of fabricating a device for providing a constant voltage to an external load at an output terminal, comprising:
- serially connecting an inductor and a switching transistor between an input terminal and an output terminal at a connection point;
- connecting a P type transistor between the connection point and a negative side of a power supply voltage, wherein a control electrode of the P type transistor is connected to the connection point;
- connecting a synchronous rectification transistor in parallel to the to the P type transistor;
- connecting a first end of the inductor to the connection point, and locating the output terminal at the second end of the inductor; and
- positioning the synchronous rectification transistor closer to the connection point than the P type transistor.

11. A semiconductor apparatus as claimed in claim 2, wherein, when the operation of the transistor for synchronous rectification is in the synchronous rectification mode, the P type transistor for rectification is turned on and contributes to rectification.

* * * * *